United States Patent
Yüksel et al.

(10) Patent No.: US 11,987,381 B2
(45) Date of Patent: May 21, 2024

(54) METHOD AND CONTROL UNIT FOR CONTROLLING AN OVERDETERMINED SYSTEM, SYSTEM AND AIRCRAFT

(71) Applicant: Volocopter GmbH, Bruchsal (DE)

(72) Inventors: Burak Yüksel, Mannheim (DE); Johannes Stephan, Stuttgart (DE)

(73) Assignee: Volocopter GmbH, Bruchsal (DE)

( * ) Notice: Subject to any disclaimer, the term of this patent is extended or adjusted under 35 U.S.C. 154(b) by 315 days.

(21) Appl. No.: 17/579,758

(22) Filed: Jan. 20, 2022

(65) Prior Publication Data

US 2022/0250766 A1    Aug. 11, 2022

(30) Foreign Application Priority Data

Feb. 1, 2021   (DE) .......................... 102021102251.7

(51) Int. Cl.
*B64D 45/00*  (2006.01)
*B64D 31/12*  (2006.01)
*G05D 1/00*   (2024.01)

(52) U.S. Cl.
CPC ......... *B64D 45/0005* (2013.01); *B64D 31/12* (2013.01); *G05D 1/102* (2013.01)

(58) Field of Classification Search
CPC ........ B64D 31/06; B64D 31/12; B64D 35/04; B64D 45/0005; B64C 11/46; B64C 11/48;
(Continued)

(56) References Cited

U.S. PATENT DOCUMENTS

| | | | |
|---|---|---|---|
| 2021/0107774 A1* | 4/2021 | Bock | B66C 13/08 |
| 2022/0234747 A1* | 7/2022 | Bower | B64C 29/0033 |

FOREIGN PATENT DOCUMENTS

| | | | |
|---|---|---|---|
| CN | 111240212 | * | 6/2020 |
| CN | 111240212 | | 5/2021 |

OTHER PUBLICATIONS

Santamaria-Navarro, A. Uncalibrated Visual Servo for Unmanned Aerial Manipulation, 2017, IEEE (Year: 2017).*

(Continued)

*Primary Examiner* — Russell Frejd
*Assistant Examiner* — Brandon Z Willis
(74) *Attorney, Agent, or Firm* — FIG. 1 Patents

(57) ABSTRACT

A method for controlling an overdetermined system with multiple actuators, for example an aircraft (1) with multiple propulsion units (3). The actuators perform at least one primary task and at least one non-primary task, including: a) determining a pseudo-control command $u_p \in \mathbb{R}^{p'}$ based on a physical model of the system, which command represents the torques (L, M, N) and a total thrust force (F) acting on the system, b) determining a control matrix D, $D \in \mathbb{R}^{p' \times k}$ according to $u_p = Du$, where $u_1 = D^{-1} u_p, u_1 \in \mathbb{R}^k$ represents a control command for the actuators to perform the primary task, c) projecting the non-primary task into the null space N(D) of the primary task, so that $Du_2 = 0$ if $u_2, u_2 \in \mathbb{R}^k$ represents a control command for the actuators to perform the non-primary task, and d) providing the control commands from b) and c) to the actuators. In this way, the solution of the primary task is not adversely affected by the non-primary task or its solution.

20 Claims, 3 Drawing Sheets

(58) Field of Classification Search
CPC ......... B64C 19/00; B64C 27/08; B64C 27/10; B64C 29/0025; B64C 29/00; G05B 17/02; G05B 13/04; G05B 13/041; G05B 13/042; G05D 1/101; G05D 1/102; G05D 1/0202; G05D 1/0808; G05D 1/0825
See application file for complete search history.

(56) References Cited

OTHER PUBLICATIONS

Santamaria-Navarro, A. Task Priority Control for Aerial Manipulation, 2014, IEEE (Year: 2014).*
T. Peni, B. Vanek, G. Liptak, Z., Szabó and J. Bokor, "Nullspace-Based Input Reconfiguration Architecture for Overactuated Aerial Vehicles," in IEEE Transactions on Control Systems Technology, vol. 26, No. 5, pp. 1826-1833, ,doi:10.1109/TCST.2017.2737622, Sep. 2018.

* cited by examiner

METHOD AND CONTROL UNIT FOR CONTROLLING AN OVERDETERMINED SYSTEM, SYSTEM AND AIRCRAFT

INCORPORATION BY REFERENCE

The following documents are incorporated herein by reference as if fully set forth: German Patent Application No.: 10 2021 102 251.7, filed Feb. 1, 2021, from which priority is claimed.

TECHNICAL FIELD

The invention relates to a method for controlling an overdetermined system with multiple actuators, for example an aircraft with multiple propulsion units.

The invention also relates to a control unit for controlling an overdetermined system with multiple actuators, for example an aircraft with multiple propulsion units.

The invention further relates to an overdetermined system with multiple actuators.

Finally, the invention also relates to an aircraft with multiple propulsion units and optionally further actuators, such as movable flaps or winches, which together form an overdetermined system.

BACKGROUND

Airplanes, flying machines or aircraft with overdetermined actuation ("over-actuation", i.e. the aircraft has a larger number of actuators than is necessary for the execution of so-called primary tasks in its control volume) offer the possibility of realizing this task with more than one solution. This intuitively implies that, depending on the airplane type, the actuator type, and the tasks defined in the control volume, there may be additional room to perform one or more other (non-primary) tasks Combining different tasks with a respective priority in such a way that low-priority tasks do not affect high-priority tasks is not a trivial task. The way secondary or third-level (tertiary or generally non-primary) tasks are added to a control and allocation problem (assignment problem) can substantially affect the available performance for solving a primary task and the stability of that solution.

In European Patent Application 19 212 935.1, the applicant proposes a method for operating an eVTOL flying machine with 18 rotors, in which the primary control assignment finds a solution with so-called "L-2" minimization for the provision of the required thrusts and torques, while imposing a secondary and lower priority (not primary) compulsion to reduce the maximum LTU (lift thrust unit) power. This is carried out by changing the gain parameters of the assignment problem as a function of the deviation of an LTU value (the revolution rate—RPM) from the corresponding average value of the total LTUs (so-called "L-inf" minimization). Two tasks are carried out in one step, which makes it impossible to assign a different priority or criticality to the different goals. In addition, a failure or erroneous behavior when achieving a goal with lower criticality (for example a secondary goal) can negatively affect solving a task with higher criticality (for example a primary goal).

SUMMARY

The invention is based on the object of remedying the situation here and specifying a method, a control unit, a system and a flying machine or an aircraft of the respective type mentioned, with which, in addition to the solution of at least one primary task, the solution of at least one non-primary task is possible without adversely affecting the primary task or its solution.

This object is achieved by a method with one or more of the features disclosed herein, by a control unit with one or more of the features disclosed herein, by a system with one or more of the features described herein, and by an aircraft with one or more of the features described herein.

Preferred further developments are defined below and in the claims.

A method according to the invention for controlling an overdetermined system with multiple actuators, for example an aircraft with multiple propulsion units, winches, flaps or the like, wherein the actuators perform at least one primary task and at least one non-primary task, includes:

a) determining a pseudo-control command based on a physical model of the system, which pseudo control command represents in particular the torques and a total thrust force acting on the system;

b) determining a control matrix D, $D \in \mathbb{R}^{p \times k}$ according to $u_p = Du$, so that $u_1 = D^{-1} u_p u_1 \in \mathbb{R}^k r$ represents a control command for the actuators to perform the primary task, c) projecting the non-primary task into the null space $N(D)$ of the primary task, so that $Du_2 = 0$ if $u_2$, $u_2 \in \mathbb{R}^k$ represents a control command for the actuators to perform the non-primary task, and d) providing the control commands from b) and c) or an overall control command to the actuators.

A control unit according to the invention for controlling an overdetermined system with multiple actuators, for example an aircraft with multiple propulsion units, winches, flaps, etc., wherein the actuators perform at least one primary task and at least one non-primary task, is designed and set $u_p$, in particular software technically, for a) determination of a pseudo-control command $u_p \in \mathbb{R}^{p'}$ based on a physical model of the system, which pseudo-control command represents in particular the torques and a total thrust force acting on the system, b) determination of a control matrix D, $D \in \mathbb{R}^{p \times k}$ according to $u_p = Du$, so that $u_1 = D^{-1} u_p u_1 \in \mathbb{R}^k$ represents a control command for the actuators to perform the primary task, c) projecting the non-primary task into the null space $N(D)$ of the primary task so that $Du_2 = 0$ if $u_2 u_2 \in \mathbb{R}^k$ represents a control command for the actuators to perform the non-primary task, and d) providing the control commands from b) and c) or an overall control command for the actuators in order to control them accordingly.

The control unit may be further designed and set up to carry out further developments described below of the method according to the invention.

An overdetermined system according to the invention comprises multiple actuators actively connected to a control unit according to the invention.

An aircraft according to the invention comprises multiple propulsion units and optionally further actuators, such as movable flaps or winches, which together form an overdetermined system according to the invention, in particular in the form of a multicopter with a number of preferably electrically driven rotor units.

"Actuators" are understood in the present case in particular, but not exclusively, to mean propulsion units, such as rotor units or the like. In addition, depending on the design of the system (the flying machine), there are other means, such as flaps, winches, etc. or generally means of operation, which the system needs to perform certain physical tasks.

A method for assigning task priorities to overdetermined systems (for example flying machines) is proposed, in which low-priority tasks (non-primary tasks) are projected into the null space of higher priority tasks (primary tasks). This ensures that the low-priority tasks do not adversely affect the high-priority tasks or their solution.

In the present case, "null space" is to be understood as the core of a (linear) mathematical representation. The core of a linear representation f:V→W between vector spaces V and W consists of those vectors in V which are mapped to the zero vector in W; it is therefore the solution set of the homogeneous linear equation f (x)=0 and is therefore also referred to as a null space.

Looking at the example from EP 19 212 935.1, the primary task may be to find the solution of the control assignment to generate the required (total) thrust and the required torques with "L-2 minimization". Accordingly, a secondary, i.e. non-primary, task can be the reduction of the maximum LTU power with "L-inf minimization". If this secondary task is projected into the null space of the primary task according to the present invention, it is ensured that it does not affect the solution of the primary task. This is desirable for safety reasons, as the primary task is essential, but the secondary task is only preferable. In addition, another subordinate (for example tertiary task) can be assigned, for example reducing the power of a particular (or multiple) LTU(s) to for example 75% because the drive unit in question was overheated or classified as faulty. As part of a corresponding further development of the invention, the tertiary task is projected into the null space of the primary and secondary tasks, so that it does not adversely affect the higher prioritized tasks.

In the example above, the secondary and tertiary tasks can swap places depending on the requirement and prioritization. In this application, achieving the required thrust and torques is considered a primary task, and everything else (secondary, tertiary or other tasks) is considered non-primary.

The presented method can also be used for quaternary, quinary or other tasks if there is still appropriate space in the null space. If there is no more space in the null space, these tasks are simply ignored due to the definition of the null space.

It should be emphasized that the proposed idea provides an extremely advantageous separation of tasks according to their respective criticality, which can be used for assigning different design assurance levels (DAL) of functions with different criticalities and goals. This has a noticeable influence on the reduction of the development costs of safety-critical devices, such as flying machines.

Although reference has been repeatedly made here and below to flying machines, the described method is also generally suitable for controlling overdetermined actuator systems of any kind.

At this point, the mathematical-physical background of the invention—in particular with regard to flying machines—will be briefly discussed in more detail in order to facilitate understanding.

The equations of motion of systems which can be derived with the Newton-Euler principle or the Lagrange method can be represented as follows:

$$M(x)\ddot{x}+c(x,\dot{x})+g(x)+G(x)u_p=f_{ext},\qquad\text{Equation 1}$$

wherein $x\in\mathbb{R}^m$ denotes the in-dimensional configuration vector of the system, for example positions and rotations in 3D, $M(x)\in\mathbb{R}^{m\times m}$ denotes the state-dependent generalized inertial torque, $(c,\dot{c})\in\mathbb{R}^m$ denotes the state-dependent Coriolis forces, $g(x)\in\mathbb{R}^m$ denotes the gravitational forces, and $f_{ext}\in\mathbb{R}^m$ are the external forces and torques, for example due to aerodynamics, contact, etc. The required physical control commands (or pseudo-control commands) for the system are designated as $u_p\in\mathbb{R}^{p'}$, which are for example calculated with a feedback control law and used to control the system. These pseudo-control commands are the body-fixe forces and torques acting on the system through different actuators, and they each enter the system dynamics given in equation 1 with a rule input matrix $G(x)\in\mathbb{R}^{m\times p'}$. These matrices contain in particular the information about an over-/under-actuation.

For the calculation of $u_p$ control methods (or laws) are used (for example direct dependencies or feedback control laws, etc.). The connection between these calculated control commands and the actual actuator control commands $u_p, u\in\mathbb{R}^k$ is made by means of an assignment or allocation problem, which contains in particular the geometric knowledge about the positioning of the actuators in the system and other actuator-relevant configurations and properties. The following applies:

$$u_p=Du,\qquad\text{Equation 2}$$

wherein $D\in\mathbb{R}^{p'\times k}$ defines the so-called control effectiveness matrix (in short: control matrix). According to the use of control methods—as mentioned above—the pseudo-control commands $u_p$ are first calculated. However, these must be distributed to the physical actuators in the form of the actual control commands u, which is commonly known as the control mapping problem or allocation problem. Therefore, a type of inverse matrix calculation is required to calculate u from $u_p$. This is represented by $$u=D^{-1}(W,u^{min},u^{max})u_p,\qquad\text{Equation 3}$$

wherein this inversion is usually carried out taking into account a weight or weighting matrix $W_i\in\mathbb{R}^{k\times k}$ and the physical limits of each actuator, for example $u_{min}\in\mathbb{R}^k$ and $u^{max}\in\mathbb{R}^k$, wherein $\forall i=1,\ldots,k$ $u_k^{min}\leq u_i\leq u_k^{max}$.

We refer to $(A=D^{-1}(W,u^{min},u^{max})\in\mathbb{R}^{k\times p'}$ as the "control mapping matrix" (or the allocation matrix).

For a flying machine, such as the 18-rotor Volocopter® aircraft from the applicant's company, $u_p\in\mathbb{R}^4$ represents a vector which contains the required (control) thrust and the three-dimensional (actuation) torques which act on the flying machine with regard to its center of gravity. Furthermore, there is a vector $u\in\mathbb{R}^{18}$ which contains the eighteen (18) desired rotor control commands.

The distributed actuator control commands u were calculated above using the mapping matrix $A\in\mathbb{R}^{k\times p'}$, which is a result of a matrix inversion problem. For systems with a redundant number of actuators (i.e. k>p'), there may be more than one solution to this inversion problem if the control matrix has enough linearly dependent columns (this is known to those skilled in the art who are familiar with linear algebra). In this application, such systems are referred to as "overdetermined systems".

The presence of more than one solution to the inversion problem creates the possibility of a "null space" different from zero which can be used for other (secondary or tertiary or generally lower prioritized) tasks without jeopardizing the main goal (the primary task or its solution). In the present case, the primary task consists of the calculation of the actuator control commands u from the required physical control commands. $u_p$.

The null space, also known as the core, of a matrix $D \in \mathbb{R}^{p \times k}$ is the set of all vectors v, so that D v=0. Therefore, the null space of the matrix D can be defined as:

$$N(D)=\{v | D\ v=0\}.$$

A possible representation of the null space of a matrix D can be calculated according to:

$$N(D)=I-D^T(D^{-1})^T \in \mathbb{R}^{k \times k}$$

wherein $I \in \mathbb{R}^{k \times k}$ is a k×k identity matrix.

If one assumes that the primary goal is achieved by using the mapping matrix, i.e.

$$u_1 = D^{-1} u_p,$$

then $u_1 \in \mathbb{R}^k$ is the vector which contains the actuator commands which achieve the primary goal of generating the required physical control commands $u_p$, i.e. which solve the primary task. The mapping generates executable commands, i.e.

$$u_1 \in U := \{u \in \mathbb{R}^k | u^{min} \leq u \leq u^{max}\}.$$

A corresponding embodiment of the method according to the invention provides that the null space N(D) is calculated according to $N(D)=I-D^T (D^{-1})^T \in \mathbb{R}^{k \times k}$, with $u_1=D^{-1}u_p$, wherein $u_1 \in \mathbb{R}^k$ is the vector or control command containing those actuator commands which solve the primary task and generate necessary physical control commands $u_p$ for the actuators, with $u_1 \in U := \{u \in \mathbb{R}^k | u^{min} \leq u \leq u^{max}\}$.

If one now considers $u_2^{org} \in \mathbb{R}^k$, which is calculated to achieve a secondary (not primary) goal, then $u_2^{org}$ can be projected onto the null space of the control matrix used for the primary goal according to $$u_2 = N u_2^{org}.$$

A corresponding embodiment of the method according to the invention provides that $u_2^{org} \in \mathbb{R}^k$ is first calculated to solve the non-primary task, and that $u_2^{org}$ is then projected onto the null space N(D) of the control matrix D according to $u_2 = N u_2^{org}$.

Then the complete control command is calculated in particular as follows:

$$u = u_1 + u_2.$$

In this way, both u and $u_1$ generate the same physical control commands $u_p$, i.e.

$$u_p = Du = Du_1,$$

since $Du_2 = DNu_2^{org} = 0$.

This guarantees that the primary goal will be achieved in any case and the secondary goal will be achieved only if there is enough space in the null space.

A corresponding embodiment of the method according to the invention thus provides that subsequently a complete control command u is calculated as follows: $u=u_1+u_2$, wherein u and $u_1$ generate the same control commands $u_p$ since $u_p = Du = Du_1$ because $Du_2 = DNu_2^{org} = 0$.

In order to advantageously ensure the feasibility of the overall command, so that u∈U, the following limits should preferably be adhered to in the secondary assignment step:

$$u_2^{org} \in u_2 := \{u_2^{org} \in \mathbb{R}^k | u^{min} - u_1 \leq N_2 u_2^{org} \leq u^{max} - u_1\}.$$

A corresponding embodiment of the method according to the invention thus provides that $u_2^{org} \in U_2 := \{u_2^{org} \in \mathbb{R}^k | u^{min} - u_1 \leq N_2 u_2^{org} \leq u^{max} - u_1\}$.

The same approach can be applied to a tertiary task (and accordingly to other, subordinate tasks), wherein it is assumed for example that $u_3^{org} \in \mathbb{R}^k$ results. Then this follows accordingly $\mathbb{R}$ $$u_3 = N u_3^{org}.$$

Then the complete control command is $$u = u_1 + u_2 + u_3,$$

wherein in turn it is ensured that the primary goal is always achieved, i.e.

$$u_p = Du = Du_1.$$

This continues recursively, resulting in the following for the i-th task:

$$u_i = N u_i^{org},$$

and $$u = \Sigma_{i=1}^n u_i.$$

Similarly, for the generalized limits, the following can be written:

$$u_i \in U_i := \{u_i \in \mathbb{R}^k | u^{min} - u_\Sigma \leq N\ u_i \leq u^{max} - u_\Sigma\}$$

wherein $u_\Sigma = \Sigma_{j=1}^{i-1} u_j$.

This control assignment with task prioritization using null space projections can be used advantageously for flying machines with distributed actuators, among others.

An example of an overdetermined system is a multi-engine aircraft with k=18 distributed actuators fixed in a common body reference system, which corresponds to the design of the Volocity® and the Volodrone® from the applicant's operation. The former is used as a passenger-carrying air taxi and the latter for the purpose of carrying payloads.

The proposed method can also be used for any other system with an excessive number of actuators if the system is overdetermined. If the actuators can move relative to a common body reference system (for example tilt actuators or flaps/wings), then the control matrix may differ for tasks with different priorities. The proposed method is also applicable to such configurations.

The primary task is to provide the physical control forces (for example torques and thrust) generated by the (flight) control law, i.e.

$$u_1 = D^{-1} u_p,$$

wherein the solution of the inversion problem (the mapping matrix) is preferably calculated in such a way that it minimizes the energy consumption caused by $u_1$. That is, $A=D^{-1}(W, u^{min}, u^{max})$ is applied with an L-2 minimization goal to $u_1^T W u_1$ (for example in the form of the well-known Moore-Penrose pseudo-inversion method).

A corresponding embodiment of the method according to the invention provides that the inverse of the control matrix D according to $u_1=D^{-1}u_p$ for the primary task is calculated in such a way that an expression $u_1^T W u_1$ is minimized, for example using the Moore-Penrose inversion method, wherein $u=D^{-1}(W, u^{min}, u^{max})u_p$, with the weighting matrix $W_i \in \mathbb{R}^{k \times k}$ and physical load limits, $u^{min} \in \mathbb{R}^k$ and $u^{max} \in \mathbb{R}^k$, with $\forall i=1, \ldots, k: u_k^{min} \leq u_i \leq u_k^{max}$, for each actuator.

The secondary non-primary) task may be designed to reduce the maximum peaks in the actuator commands but is of course not limited to this. Unlike in EP 19 212 935.1, however, it is ensured in the present case that the secondary task or its solution does not adversely affect the primary task. Thus, the secondary task is achieved by calculating those actuator commands $u_2$ which seek to bring the components of the primary actuator commands $u_1$ which are above the average value (or any other reference value) closer to this value. This allows an equivalent distribution of actuator commands (to solve the primary task), which implicitly reduces the maximum peaks. In this sense, the described secondary task has an L-inf minimization goal.

For this purpose, the average value of the actuator commands which achieve the primary goal $u_1$ is preferably calculated first:

$$u_{1,m} = \frac{1}{k}\Sigma_{i=1}^{k} u_1(i), \forall i = \{1, \ldots k\}.$$

Then the difference between the actuator commands which achieve the primary goal and the average value is given by:

$$u_d = u_1 - u_{1,m}.$$

Then those actuator commands for the secondary task are calculated which aim to reduce $u_d$ for the final actuator commands:

$$u_2^{org}(i) = \begin{cases} -u_d(i), & \text{if } u_d(i) > 0 \\ 0, & \text{otherwise} \end{cases}, \forall i = \{1, \ldots k\}.$$

A corresponding embodiment of the method according to the invention provides that the control commands for solving the non-primary task, $u_2 = Nu_2^{org}$, are calculated in such a way that components of the control commands for solving the primary task, $u_1$, approach an average value, by means of the steps:

(i) calculating an average of the control commands to solve the primary task: $u_1$ $$u_{1,m} = \frac{1}{k}\sum_{i=1}^{k} u_1(i), \forall i = \{1, \ldots k\}$$

(ii) determining a difference between the control commands to solve the primary task, $u_1$, and the average value:

$$u_d = u_1 - u_{1,m}$$

(iii) calculating the control commands to solve the non-primary task in order to reduce $u_d$:

$$u_2^{org}(i) = \begin{cases} -u_d(i), & u_d(i) > 0 \\ 0, & \text{otherwise} \end{cases}, \forall i = \{1, \ldots k\}.$$

The null space is calculated as follows:

$$N = I - D^T(D^{-1})^T \in \mathbb{R}^{k \times k},$$

and the secondary task is projected onto this null space as follows:

$$u_2 = Nu_2^{org}.$$

A preferred further development of the method according to the invention provides that, in addition to the primary task and the non-primary task, at least one (further) subordinate task is defined, which is to be carried out by the actuators, for example a load reduction $\mu_j$ for at least one actuator j, $\mu_j \in [0,1]$, with control commands $u_3 = Nu_3^{org}$, so that $$u_3^{org}(j) = -(1-\mu_j)(u_1(j) + u_2(j)),$$

wherein a complete control command is then calculated as follows: $u = u_1 + u_2 + u_3$.

Alternatively, it may be provided that, in addition to the primary task and the non-primary task, at least one (further) subordinate task is defined, which is to be performed by the actuators, for example a load reduction $\mu_j$ for at least one actuator j, $\mu_j \in [0,1]$, with control commands $u_3 = Nu_3^{org}$, so that $$u_3^{org}(j) = -(1-\mu_j)u^{max},$$

wherein a complete control command is then calculated as follows: $u = u_1 + u_2 + u_3$.

Such a tertiary task can preferably be defined to adjust the commands of individual actuators if, for example, one or more actuators must perform a task with reduced load. This can be the case if one or more actuators is (are) taken into account but is (are) overloaded or overheated. There may be other reasons for adjusting the commands of individual actuators.

As an example, it should be assumed that actuator j should work with efficiency $\mu_j$, $\mu_j \in [0.1]$ (for example 0.75, i.e. 75%). The commands for more than one actuator can also be adjusted if desired. The decision as to which actuator should be controlled with which efficiency can preferably be made by an actuator observation function (implemented in the form of an actuator observation device), the implementation details of which are not discussed further in this application.

Then the actuator commands which perform the tertiary task are calculated according to the logic shown in FIG. 1 as an example, as already described above.

For systems in which the actuators are fixed in relation to the flying machine, there is the already mentioned control matrix D. Therefore, the null space for this task is again N as indicated above.

Then the tertiary task is projected onto this null space in such a way that it does not affect either the secondary task or the primary task:

$$u_3 = Nu_3^{org}.$$

Finally, the total actuator commands (or control commands) are:

$$u = u_1 + u_2 + u_3,$$

wherein it is again ensured that the primary task is not affected by the secondary tasks and tertiary tasks (non-primary tasks).

The order of the tasks can be changed depending on the priority within the scope of the invention.

A special further development of the control unit according to the invention provides that this is actively connected to devices for measuring and/or determining parameters and states of the system and/or the actuators, which are required for the determination of the pseudo-control command according to step a), in particular by a main flight control unit.

Another further development of the control unit according to the invention provides that this is actively connected to an actuator observation device, which is designed and set up to determine, on the basis of measured or certain parameters and states of the system and/or the actuators, the actuators j for which the subordinate task—as described above—is to be carried out and in particular to provide the associated value $\mu_j \in [0,1]$ if necessary.

A specific reference to the use case "flying machine" is described blow. Accordingly, a further development of the method according to the invention provides for the application of the same to an aircraft with multiple propulsion units, preferably 18 propulsion units, k=18, which propulsion units form at least some of the actuators of the system.

The implementation in question presents a method for controlling an overdetermined aircraft with task/goal prioritization, with which a different number of tasks for actuators of the aircraft can be managed in such a way that a primary task is not adversely affected by non-primary tasks, while all tasks are performed in the best possible way depending on a flying machine design. This is ensured by assigning the non-primary tasks to the null space of the primary task, as has already been described multiple times. The layout of the aircraft (for example the placement of the actuators) plays an important role in the configuration of the null space; this defines how well the non-primary tasks can be performed without jeopardizing the primary task.

The mathematics presented here are universally valid. Their algorithmic implementation does not require any external measurements or sensor inputs. The control matrix D and the primary and non-primary control tasks/goals must be known or specified in the order of their priority. The present patent application focuses by way of example on the implementation of the method for overdetermined systems in the form of aircraft, for example of the Volocity® or Volodrone® type aircraft, which have a 4-dimensional control volume, but (without limitation) 18 actuators. It is explained below how the method or a corresponding algorithm can be implemented for such flying machines.

Flight control laws for stable and controlled trajectory tracking (for example location, altitude and—if possible—positions and speeds) calculate the pseudo control command $u_p \in \mathbb{R}^4$, which represents the three torques and a collective thrust which should act physically on the body of the aircraft. This is shown schematically in FIG. 2. There, L, M and N denote the torques around the axes x, y and z (roll axis, pitch axis and yaw axis) of the flying machine 1, and F denotes the total thrust. Reference character 2 symbolizes the (main) flight control unit of the flying machine 1, which implements or executes the aforementioned flight control laws, and reference character 3 denotes one of 18 identical propulsion units (actuators), each comprising an (electric) motor 3a and a rotor 3b. Reference character 4 refers to one of many sensor units by way of example which is actively connected to the flight control unit 2.

The primary goal (primary task) of the flight control unit is to realize the four-dimensional thrust and torque vectors which act on the aircraft (generally on/around its center of gravity). For this reason, $u_1 = D^{-1} u_p$ is first calculated (wherein $u_1 \in \mathbb{R}^{18}$A is a vector which contains the actuator commands which are calculated to meet the primary goal). The solution of the inversion problem (the mapping or allocation matrix A) is preferably calculated in such a way that it minimizes energy consumption caused by $u_1$. This means that $$A = D^{-1}(W, u^{min}, u^{max})$$

with an L-2 minimization goal with regard to $u_1^T W u_1$ (for example Moore-Penrose pseudo-inversion) taking into account the physical actuator load limits. The calculation of $u_p$ should be done in advance. This is preferably done by a main (flight) control law implemented in the (main) flight controller or control unit, which requires or undertakes an estimate of the attitude state of the flying machine (3D rotations in the form of angles or quaternions or rotation matrices and their derivatives, i.e. rotational speeds or rotational accelerations), an altitude estimate (vertical altitude, speed and accelerations) and, if available, an estimate of the horizontal position/speed and accelerations. To calculate these estimates, inertial measuring instruments, barometers, GNSS and, if available, camera/ultrasound/lidar/radar are traditionally required as sensors to improve the quality of the estimates (see reference character 4 in FIG. 2). The flight control laws used are therefore usually state-feedback control laws designed to stabilize the aircraft and provide sufficient controllability and maneuverability, while at the same time being robust against system-internal and external unknowns.

The primary goal, as explained above, is the pseudo-control command $u_p$, and this should be sent as a control command $u_1$ to the individual actuators. Before that, however, the secondary goal is calculated and its contribution is added to the actuator commands without affecting the primary goal (because the null space of the primary task is used for this). The secondary task is carried out only as long as the primary task is not affected. The secondary task may be to reduce the maximum peaks in the actuator commands, as described in another context in application EP 19 212 935.1. In the present case, however, it is ensured that the secondary task does not affect the primary task. The secondary task is thus solved in particular by the calculation of those actuator commands $u_2$ which seek to bring the components of the primary actuator commands $u_1$ which are above the average value closer to this average value. This technique allows an equivalent distribution of actuator commands (in the sense of the primary task), while implicitly reducing the maximum peaks. In this context, the secondary task has in particular an L-inf minimization goal. This step does not require sensor data input.

It should be noted that the primary task was designed in the four-dimensional space in which the physical torques and thrust acting on the flying machine are defined (cf. FIG. 2). The secondary task, on the other hand, is first designed in the present 18-dimensional space in which the actuator commands are defined.

To achieve this, the average value of those actuator commands which achieve the primary goal $u_1$ is first calculated:

$$u_{1,m} = \frac{1}{k} \sum_{i=1}^{k} u_1(i), \forall i = \{1, \ldots k\}.$$

Then the difference between the actuator commands which achieve the primary goal and the average value is calculated:

$$u_d = u_1 - u_{1,m}.$$

Now, if we calculate the actuator commands for the secondary task which aims to reduce $u_d$, we get the final actuator commands of the secondary task:

$$u_2^{org}(i) = \begin{cases} -u_d(i), & \text{if } u_d(i) > 0 \\ 0, & \text{otherwise} \end{cases}, \forall i = \{1, \ldots k\}.$$

$u_2^{org}$ represents the original actuator commands to achieve the secondary goal alone. To ensure that the secondary task does not affect the primary task, we first calculate the null space of the control matrix and then project $u_2^{org}$ onto this null space. The null space is calculated as follows:

$$N = I - D^T(D^{-1})^T \in \mathbb{R}^{18 \times 18}.$$

Then the secondary task is projected onto this null space as follows:

$$u_2 = N u_2^{org}.$$

This guarantees both for $u = u_1 + u_2$ and for $u = u_1$ that the control commands in question achieve the primary goal (i.e. result in $u_p$), while $u = u_1 + u_2$ also enables the secondary goal to be achieved (if the null space allows it).

With the logic presented, the scope of control can include additional tasks/goals with lower priority. For example, as an additional (tertiary) task, the adjustment of the commands of the individual actuators can be selected if, for example, one actuator or multiple actuators must be exposed to a lower load for certain reasons. This can happen if, for example, one actuator or multiple actuators is/are to be taken into account but is/are overloaded or overheated or otherwise defective. There may also be other reasons for adjusting the commands for individual actuators. A logic capable of recognizing such states is not as such part of the present application: however, a corresponding method can use the available flying machine states (using inertial measurement units, GNSS, barometers, etc.), vibration sensors on the actuators, temperature sensors on the actuators as well as actuator and flying machine models (cf. reference character 4 in FIGS. 1 and 2). In this application, the logic in question is referred to as an "actuator observation device", and this logic/algorithm preferably provides at least two important values: which actuators (there may be multiple) should be adjusted ($u_j$) and to what extent ($\mu_j \in [0,1] u_3^{org}$) this should be done in each case. Then preferably one of the logics shown in FIG. 1 for the calculation of $u_3^{org}$ will be implemented or executed.

The tertiary task thus determined or its solution is projected onto the null space as follows:

$$u_3 = N u_3^{org}.$$

The final overall control commands sent to the actuators in this case are:

$$u = u_1 + u_2 + u_3.$$

Again, it is worth noting that both $u = u_1 + u_2 + u_3$ and $u = u_1$ guarantee the achievement of the primary goal (the provision of $u_p$), while the former control command $u = u_1 + u_2 + u_3$ is also of service in achieving the secondary and tertiary goals (if the null space allows it).

BRIEF DESCRIPTION OF THE DRAWINGS

Further properties and advantages of the invention result from the following description of the figures.

DETAILED DESCRIPTION

Figure 1:
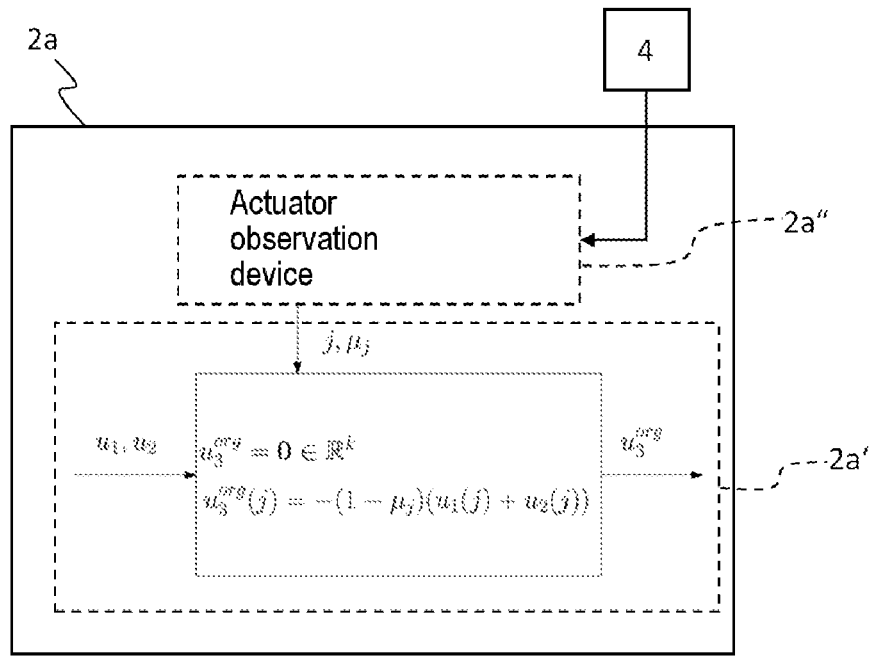
FIG. 1 shows the logic of an actuator observation function or device used in an embodiment of the method.
Figure 1:
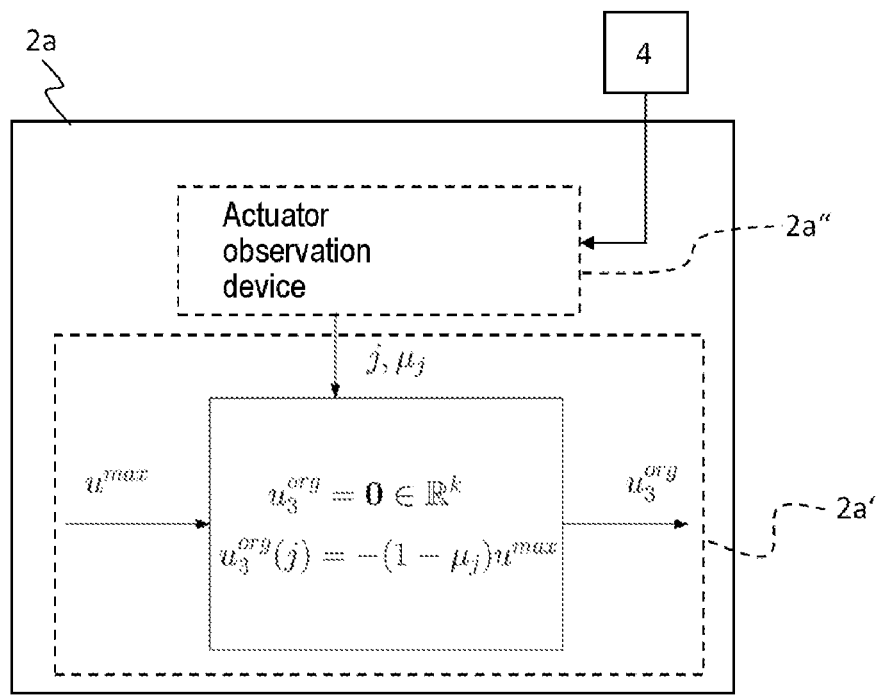
Figure 2:
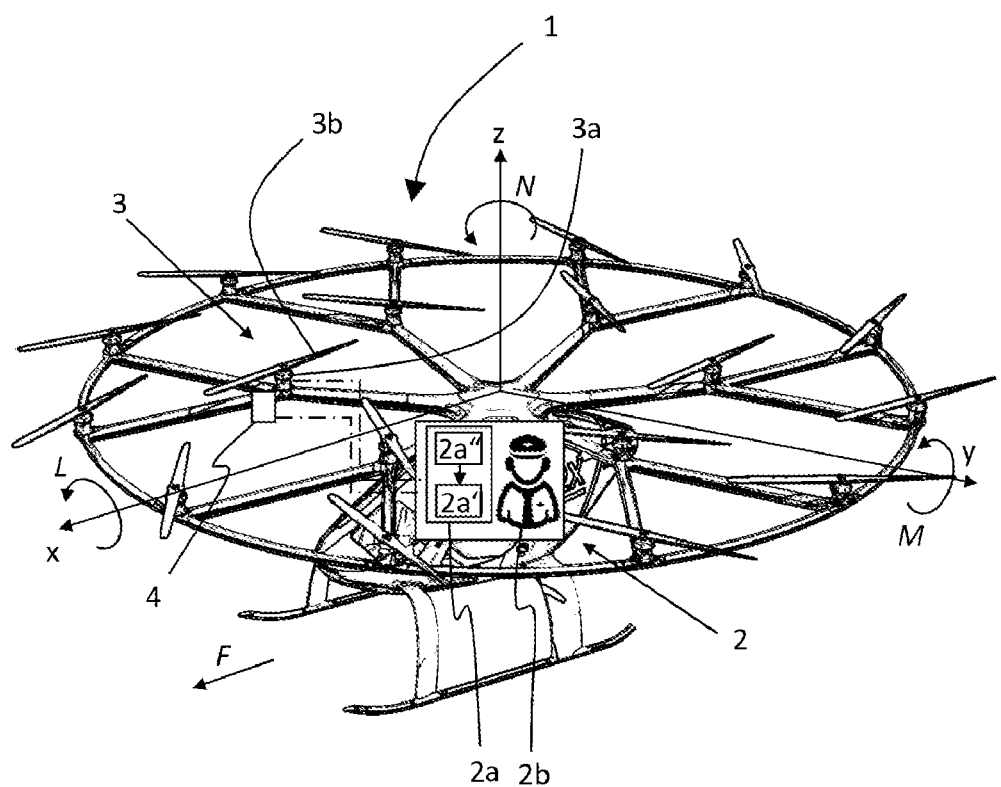
FIG. 2 shows a flying machine according to the invention.

In FIG. 1, a special further development of the control unit according to the invention for an overdetermined system, for example a flying machine, is shown at reference character 2a (see also FIG. 2 and associated description). This further development provides that the control unit 2a has an active connection to devices for measuring and/or determining parameters and states of the system and/or the actuators, which are required for the determination of the pseudo-control command according to step a), in particular by a main flight control unit. These devices (sensors) are symbolically represented with reference character 4 (cf. also FIG. 2 and associated description).

The control unit 2a has an active connection to an actuator observation device 2a", which is designed and set $u_p$ to determine, on the basis of the parameters and states of the system and/or the actuators measured or determined at reference character 4, the actuators j for which a subordinate (tertiary) task—as described above—is to be carried out and in particular if necessary to provide the associated value $\mu_j \in [0,1]$, which is then used by the actual control algorithm 2a' (see also FIG. 2 and associated description).

The upper subfigure in FIG. 1 shows the case in which, in addition to the primary task and the non-primary task, at least one (further) subordinate task is defined, which is to be performed by the actuators, for example a load reduction $\mu_j$ for at least one actuator j, $\mu_j \in [0,1]$, with control commands $u_3 = N u_3^{org}$, so that $$u_3^{org}(j) = -(1-\mu_j)(u_1(j) + u_2(j)),$$

wherein a complete control command is then calculated as follows: $u = u_1 + u_2 + u_3$. The load reduction factor $\mu_j$ is applied for the actuator j to the (primary and secondary) control command $u_1(j) + u_2(j)$ to obtain the new (tertiary) control command $u_3^{org}$ on the basis of $u_2$.

Alternatively, as the lower subfigure in FIG. 1 shows, it may be provided that, in addition to the primary task and the non-primary task, at least one (further) subordinate task is defined, which is to be performed by the actuators, for example a load reduction $u_j$ for at least one actuator j, $\mu_j \in [0,1]$, with control commands $u_3 = N u_3^{org}$, so that $$u_3^{org}(j) = -(1-\mu_j) u^{max},$$

wherein a complete control command is then calculated as follows: $u = u_1 + u_2 + u_3$. The load reduction factor $\mu_j$ is applied to a maximum (physical) control value $u^{max}$ for the actuator j in order to obtain the new (tertiary) control command $u_3^{org}$ the basis of $u^{max}$.

Such a tertiary task can preferably be defined to adjust the commands of individual actuators if, for example, one or more actuator(s) must perform a task with reduced load. This can be the case if one or more actuators is/are taken into account but is/are overloaded or overheated.

As an example, it should be assumed that actuator j should work with efficiency $\mu_j$, $\mu_j \in [0,1]$ (for example 0.75, i.e. 75%). The decision as to which actuator should be controlled with which efficiency can preferably be made by an actuator observation function (implemented in the form of the actuator observation device 2a").

FIG. 2 shows—as already mentioned—a system according to the invention or a flying machine 1 in the form of a multicopter with 18 propulsion units (actuators). In FIG. 2, L, M and N denote the torques around the axes x, y and z (roll axis, pitch axis and yaw axis) of the flying machine 1, and F denotes the total thrust. Reference character 2 symbolizes the main flight control unit of the flying machine 1, which preferably comprises the control algorithm 2a' and the actuator observation device 2a" from FIG. 1 and is generally set up for carrying out the method according to the invention and further developments thereof, in particular software technically. In the case of reference character 2b, a human pilot is also shown, which is not worth noting further in the present case. Reference character 3 refers to one of the 18 (without limitation, identical) propulsion units or actuators, each comprising an (electric) motor 3a and a rotor 3b. Reference character 4 refers to an exemplary sensor unit actively connected to the main flight control unit 2, which has already been pointed out. In order to be able to take into account the available flying machine states in a further development of the method according to the invention, a variety of such sensor units 4 may be provided, in particular inertial measuring units, GNSS, barometers, vibration sensors on the actuators, temperature sensors on the actuators, and the like.

The invention is not limited in its application to flying machines 1 as overdetermined systems.

Figure 3:
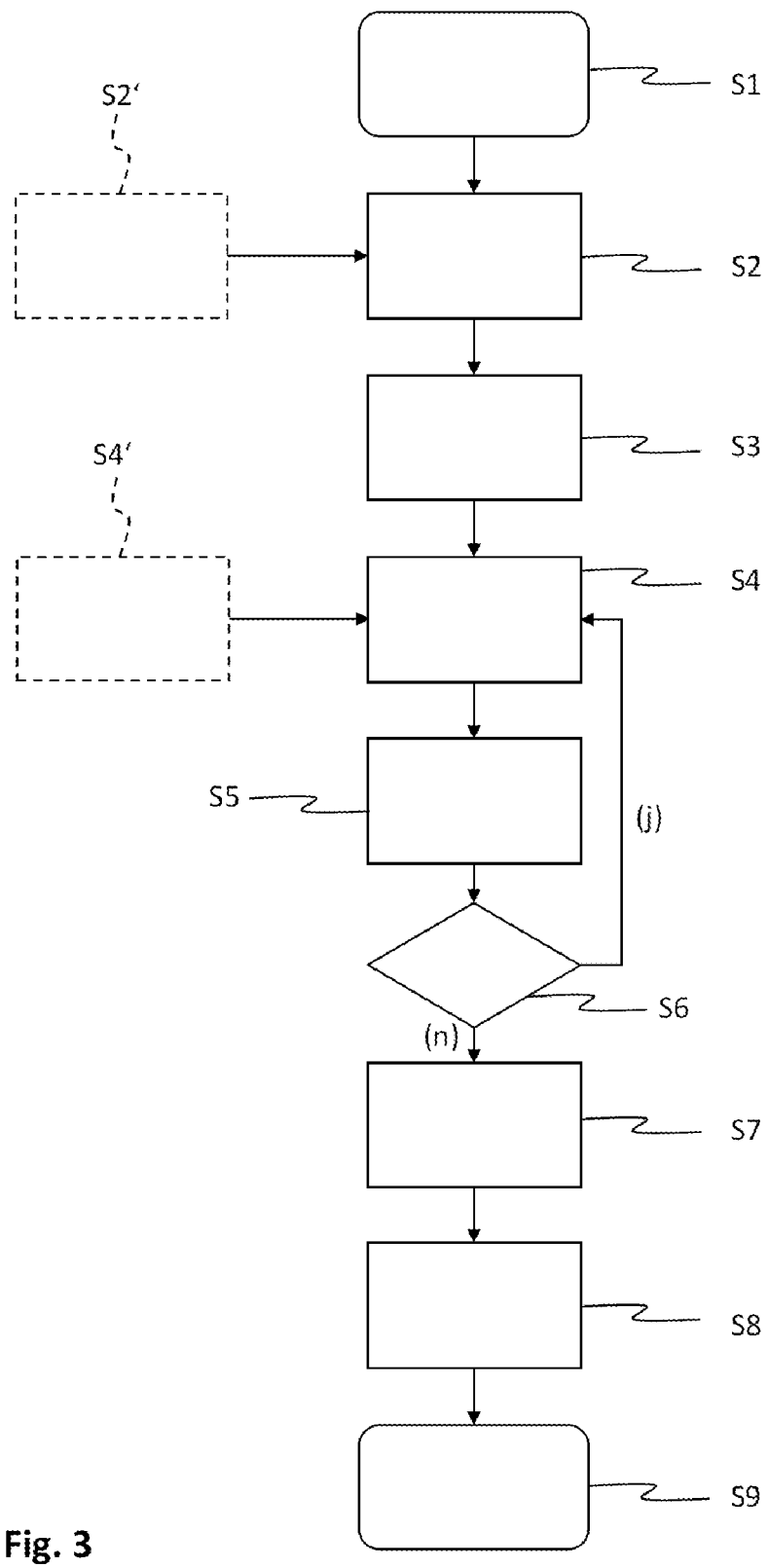
FIG. 3 shows a possible sequence of the method according to the invention.

FIG. 3 shows a possible sequence of the method according to the invention. It starts in step S1. In step S2 the pseudo-control command is calculated as described in detail above. For this purpose, (sensor) measured values etc. from step S2' can be used, as also described. In step S3, the calculation of $u_p, u_1 = D^{-1} u_p$ to solve the primary task is carried out with the help of the control matrix D, as indicated. In step S4 a secondary task is defined and the associated control command $u_2^{org}$ is calculated. For this purpose, (sensor) measured values etc. from step S4' can be used, for example temperature measured values, as already described. Then, in step S5, the non-primary (secondary) task or the corresponding control command $u_2^{org}$ is projected into the null space N(D) of the primary task, so that $Du_2 = 0$ if $u_2, u_2 \in \mathbb{R}^k$ represents a control command for the actuators to perform the non-primary task. This, too, has been described in detail above.

Step S6 contains a query as to whether further subordinate (non-primary, for example tertiary) tasks need to be solved. If so (j), steps S4 (if appropriate S4') and S5 are adjusted accordingly (for example with $u_3^{org}$) and repeated for the further task. Once the query is answered with no (n) in step S6, the method jumps to step S7, where the overall control command is determined: $.=u_1+u_2+\ldots$, depending on the number of tasks solved (see above). In step S8, this overall control command is applied to control the actuators, and the method ends with step S9.

The invention claimed is:

1. A method for controlling an overdetermined system with multiple actuators, wherein the actuators perform a primary task and a non-primary task, the method comprising:
   a) determining a pseudo-control command $u_p \in \mathbb{R}^{p'}$ based on a physical model of the overdetermined system,
   b) determining a control matrix D, $D \in \mathbb{R}^{p \times k}$ according to $u_p = Du$, so that $u_1 = D^{-1} u_p, u_1 \in \mathbb{R}^k$ represents a control command for the actuators to perform the primary task,
   c) projecting the non-primary task into a null space N(D) of the primary task, so that $Du_2 = 0$ if $u_2, u_2 \in \mathbb{R}^k$ represents a control command for the actuators to perform the non-primary task, and
   d) controlling the actuator using the control commands provided from b) and c).

2. The method as claimed in claim 1, further comprising calculating the null space N(D) according to $$N(D)=I-D^T(D^{-1})^T \in \mathbb{R}^{k \times k}$$

with $u_1 = D^{-1} u_p$, wherein $u_1 \in \mathbb{R}^k$ is a vector or control command which contains actuator commands which solve the primary task and generate necessary physical control commands $u_p$ for the actuators, with $$u_1 \in U:=\{u \in \mathbb{R}^k | u^{min} \leq u \leq u^{max}\}.$$

3. The method as claimed in claim 2, wherein $u_2^{org} \in \mathbb{R}^k$ is first calculated to solve the non-primary task, and then $u_2^{org}$ is projected onto the null space N(D) of the control matrix D according to $u_2 = Nu_2^{org}$.

4. The method as claimed in claim 3, further comprising subsequently calculating a complete control command u as follows:

$$u=u_1+u_2,$$

wherein u and $u_1$ generate same physical control commands $u_p$.

5. The method as claimed in claim 4, further comprising specifying for $u_2^{org}$ that $$u_2^{org} \in u_2:=\{u_2^{org} \in \mathbb{R}^k | u^{min}-u_1 \leq N_2 u_2^{org} \leq u^{max}-u_1\}.$$

6. The method as claimed in claim 1, wherein the overdetermined system is for an aircraft having multiple, k, propulsion units, and the propulsion units form at least some of the actuators of the overdetermined system.

7. The method as claimed in claim 1, further comprising calculating an inverse of the control matrix D according to $u_1 = D^{-1} u_p$ for the primary task such that an expression $u_1^T W u_1$ is minimized, where $u=D^{-1}(W, u^{min}, u^{max}) u_p$, with weighting matrix $W_i \in \mathbb{R}^{k \times k}$ and physical load limits $u^{min} \in \mathbb{R}^k$ and $u^{max} \in k$ with $\forall i=1, \ldots, k: u_k^{min} \leq u_i \leq u_k^{max}$, for each of the actuators.

8. The method as claimed in claim 7, wherein the expression $u_1 W u_1$ is minimized using the Moore-Penrose inversion method.

9. The method as claimed in claim 7, further comprising calculating the null space N(D) according to $$N(D)=I-D^T(D^{-1})^T \in \mathbb{R}^{k \times k}$$

with $u_1 = D^{-1} u_p$, wherein $u_1 \in \mathbb{R}^k$ is a vector or control command which contains actuator commands which solve the primary task and generate necessary physical control commands up for the actuators, with $$u_1 \in U:=\{u \in \mathbb{R}^k | u^{min} \leq u \leq u^{max}\},$$

wherein $u_2^{org} \in \mathbb{R}^k$ is first calculated to solve the non-primary task, and then $u_2^{org}$ is projected onto the null space N(D) of the control matrix D according to $u_2 = Nu_2^{org}$, and the control commands for solving the non-primary task, $u_2 = Nu_2^{org}$, are calculated such that components of the control commands for solving the primary task, $u_1$, approximate to an average by:

(i) calculating an average of the control commands for solving the primary task, $u_1$:

$$u_{1,m} = \frac{1}{k} \sum_{i=1}^{k} u_1(i), \forall i = \{1, \ldots, k\}$$

(ii) determining a difference between the control commands for solving the primary task, $u_1$, and the average:

$$u_d = u_1 - u_{1,m}, \text{ and}$$

(iii) calculating the control commands for solving the non-primary task in order to reduce $u_d$:

$$u_2^{org}(i) = \begin{cases} -u_d(i), & u_d(i) > 0 \\ 0, & \text{otherwise} \end{cases}, \forall i = \{1, \ldots, k\}.$$

10. The method as claimed in claim 1, further comprising, in addition to the primary task and the non-primary task, defining at least one subordinate task which is to be carried out by the actuators, with control commands $u_3 = Nu_3^{org}$, so that $$u_3^{org}(j) = -(1-\mu_j)(u_1(j)+u_2(j)),$$

wherein a complete control command is then calculated as follows:

$$u = u_1 + u_2 + u_3.$$

11. The method as claimed in claim 10, wherein the at least one subordinate task is a load reduction $\mu_j$ for at least one of the actuators as defined by j, $\mu_j \in [0,1]$.

12. The method as claimed in claim 1, further comprising, in addition to the primary task and the non-primary task, defining at least one subordinate task which is to be carried out by the actuators, with control commands $u_3 = Nu_3^{org}$, so that $$u_3^{org}(j) = -(1-\mu_j)u^{max},$$

wherein a complete control command is then calculated as follows:

$$u = u_1 + u_2 + u_3.$$

13. The method claim 12, wherein the at least one subordinate task is a load reduction $\mu_j$ for at least one of the actuators as defined by j, $\mu_j \in [0,1]$.

14. The method as claimed in claim 1, wherein the actuators are multiple propulsion units for an aircraft, and said pseudo-control command represent torques and a total thrust force acting on the system.

15. A control unit comprising a processor for controlling an overdetermined system with multiple actuators, wherein the actuators perform a primary task and a non-primary task, the control unit being configured for:

a) determining a pseudo-control command $u_p \in \mathbb{R}^{p'}$ based on a physical model of the system, b) determining a control matrix D, $D \in \mathbb{R}^{p \times k}$ according to $u_p = Du$, so that $u_1 = D^{-1}u_p, u_1 \in \mathbb{R}^k$ represents a control command for the actuators to perform the primary task, c) projecting the non-primary task into a null space N(D) of the primary task so that $Du_2 = 0$ if $u_2, u_2 \in \mathbb{R}^k$ represents a control command for the actuators to perform the non-primary task, and d) controlling the actuators using the control commands provided from b) and c).

16. The control unit as claimed in claim 15, wherein the actuators are multiple propulsion units for an aircraft, and said pseudo-control command represent torques and a total thrust force acting on the system.

17. The control unit as claimed in claim 16, further comprising sensors for at least one of measuring or determining parameters and states of at least one of the system or the actuators, which are required for a determination of the pseudo-control command according to step a).

18. The control unit as claimed in claim 15, further comprising an actuator observation device configured to determine, based on measured or certain parameters and states of at least one of the system or the actuators, the actuators defined by j for which a subordinate task is to be carried out and to provide an associated value $\mu_j \in [0,1]$ if necessary.

19. An overdetermined system comprising a control unit and multiple actuators actively connected to the control unit, and operable to perform a primary task and a non-primary task, wherein the control unit is configured to:

a) determine a pseudo-control command $u_p \in \mathbb{R}^{p'}$ based on a physical model of the system, b) determine a control matrix D, $D \in \mathbb{R}^{p \times k}$ according to $u_p = Du$, so that $u_1 = D^{-1}u_p, u_1 \in \mathbb{R}^k$ represents a control command for the actuators to perform the prima task, c) project the non-primary task into a null space N(D) of the primary task so that $Du_2 = 0$ if $u_2, u_2 \in \mathbb{R}^k$ represents a control command for the actuators to perform the non-primary task, and d) control the actuators using the control commands provided from b) and c).

20. The overdetermined system of claim 19, wherein the overdetermined system comprises a multicopter aircraft comprising the control unit and the actuators, wherein the actuators comprise multiple propulsion units of the multicopter aircraft including a number of electrically driven rotor units.

\* \* \* \* \*